(12) United States Patent
Fan et al.

(10) Patent No.: US 9,280,822 B2
(45) Date of Patent: Mar. 8, 2016

(54) METHOD, SYSTEM, APPARATUS, AND COMPUTER PROGRAM PRODUCT FOR INTERACTIVE HEPATIC VASCULAR AND BILIARY SYSTEM ASSESSMENT

(75) Inventors: Li Fan, Belle Mead, NJ (US); Guo-Qing Wei, Plainsboro, NJ (US); Feng Ma, Pennington, NJ (US); Cheng-Chung Liang, West Windsor, NJ (US); Jian-Zhong Qian, Princeton Junction, NJ (US); Xiaolan Zeng, Princeton, NJ (US); Changbo Yang, Wayne, PA (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 1035 days.

(21) Appl. No.: 12/776,248

(22) Filed: May 7, 2010

(65) Prior Publication Data

US 2010/0316277 A1    Dec. 16, 2010

Related U.S. Application Data

(60) Provisional application No. 61/176,689, filed on May 8, 2009.

(51) Int. Cl.
*G06T 7/00* (2006.01)

(52) U.S. Cl.
CPC ............. *G06T 7/0028* (2013.01); *G06T 7/0081* (2013.01); *G06T 2207/10081* (2013.01);
(Continued)

(58) Field of Classification Search
CPC .. A61B 2503/40; A61B 5/0073; A61B 6/037; A61B 6/4417; A61B 6/5247
See application file for complete search history.

(56) References Cited

U.S. PATENT DOCUMENTS 6,944,330 B2    9/2005  Novak et al. .................. 382/162
7,565,000 B2 *  7/2009  Capolunghi et al. .......... 382/128
(Continued)

FOREIGN PATENT DOCUMENTS

CN      1518719 A      8/2004
EP      2 247 237 A2   11/2010
(Continued)

OTHER PUBLICATIONS

Pohle et al., "Segmentation of medical images using adaptive region growing," Proc. SPIE, vol. 4322 (2001), 1337-46.
(Continued)

*Primary Examiner* — Neal Sereboff
(74) *Attorney, Agent, or Firm* — Fitzpatrick, Cella, Harper & Scinto

(57) ABSTRACT

A procedure for image segmentation on three-dimensional (3D) medical images, and a system, apparatus, and computer program that operate in accordance with the procedure. The procedure includes generating a projection including an anatomic structure, tracing a curve corresponding to the anatomic structure, extracting a curved volume of interest based on the curve and the projection, and extracting a segmentation of the anatomic structure. Also provided is a procedure for aligning anatomic structures in images, and a system, apparatus, and computer program that operate in accordance with the procedure. The procedure includes determining part of a biliary system in a first image, determining part of a hepatic portal vein or a hepatic artery in a second image, determining a gallbladder in the images, determining a cost function, and aligning the biliary system and the hepatic portal vein or hepatic artery by maximizing the cost function.

12 Claims, 13 Drawing Sheets

(52) U.S. Cl.
CPC ............... *G06T2207/10088* (2013.01); *G06T 2207/20096* (2013.01); *G06T 2207/20104* (2013.01); *G06T 2207/20141* (2013.01); *G06T 2207/30056* (2013.01); *G06T 2207/30101* (2013.01); *G06T 2219/028* (2013.01)

(56) References Cited

U.S. PATENT DOCUMENTS

| | | | |
|---|---|---|---|
| 8,175,354 B2 | 5/2012 | Liang et al. | 382/128 |
| 8,355,019 B2 * | 1/2013 | Eichenlaub | G02B 27/2221 345/419 |
| 2003/0208116 A1 | 11/2003 | Liang et al. | |
| 2006/0013482 A1 | 1/2006 | Dawant et al. | |
| 2006/0025674 A1 | 2/2006 | Kiraly et al. | 600/410 |
| 2006/0250386 A1 | 11/2006 | Movassaghi et al. | 345/419 |
| 2008/0103385 A1 | 5/2008 | Ma et al. | 600/416 |
| 2009/0018451 A1 * | 1/2009 | Bai | A61B 5/0073 600/476 |

FOREIGN PATENT DOCUMENTS

| | | |
|---|---|---|
| WO | WO 2007/002562 A2 | 1/2007 |
| WO | WO 2009/111753 A2 | 9/2009 |

OTHER PUBLICATIONS

Kuszyk et al., "CT Angiography with Volume Rendering: Image Findings," Am. J. Roentgenol, vol. 165, No. 2 (1995) 445-48.

Kim et al., "Multiplanar reformations and minimum intensity projections using multi-detector row CT assessing anomalies and disorders of the pancreaticobiliary tree," World J. Gastroenterol., vol. 13, No. 3 (2007) 4177-84.

Extended European Search Report issued on Sep. 25, 2013 in connection with European Application No. 10772908.9.

* cited by examiner

METHOD, SYSTEM, APPARATUS, AND COMPUTER PROGRAM PRODUCT FOR INTERACTIVE HEPATIC VASCULAR AND BILIARY SYSTEM ASSESSMENT

CROSS-REFERENCE TO RELATED APPLICATION

The present application claims prior to U.S. Provisional Patent Application No. 61/176,689, filed May 8, 2009, the content of which is incorporated by reference in its entirety as if set forth fully herein.

BACKGROUND

1. Technical Field

Example aspects described herein relate to medical image processing and, in particular, relate to procedures, systems, apparatuses, and computer program products for interactive pre-operative assessments of hepatic vascular and biliary systems.

2. Description of Related Art

The human liver receives approximately 30% of resting cardiac output. It is a highly vascular organ having three vascular systems: the portal vein, the hepatic vein, and the hepatic artery systems. In addition, it has a biliary system, in which the bile duct delivers bile from the liver and gallbladder into the duodenum.

Surgical intervention on the liver can be challenging because of the complex vascular anatomy of the liver. Generally speaking, after a successful operation a patient will have sufficient remaining liver tissue supplied by all four vessel systems. One way to achieve this is to perform a pre-operative hepatic vascular assessment that includes good segmentation of vessels and bile ducts and establishes reliable, quantitative spatial relationships among the vessel systems.

Good segmentation of vessels, however, can be difficult to achieve. For example, branches of hepatic artery can be very thin—as small as a single pixel wide—making segmentation of these branches difficult. Also, the imaging contrast between a small vessel branch and nearby anatomical structures can be very low. Accordingly, widely-used segmentation techniques like region growing typically do not generate sufficiently satisfactory output. Atlas and model based approaches also may not offer the desired precision because liver vascular anatomies vary largely from one patient to another. Therefore, efficiently and quickly segmenting small vessels and/or vessels having low contrast remains challenging.

Reliably assessing a patient's biliary system also can be difficult to achieve. A pre-surgical assessment of a patient's bile ducts has significant clinical importance because post-surgical bile duct complication is a commonly encountered problem. In a pre-surgery assessment, however, bile ducts often are scanned with different contrast agents and with different modalities than other intrahepatic anatomies, such as the hepatic vascular system. For example, most intrahepatic anatomies may be scanned with magnetic resonance (MR) or computer tomography (CT) techniques, while the biliary system may be scanned by magnetic resonance cholangiopancreatography (MRCP) or CT cholangiography (CTC) techniques. In these instances, the different scans of the various intrahepatic systems must be aligned in order to analyze the patient's bile duct anatomy together with the other intrahepatic anatomies. Accurate alignment requires that scans of the biliary system be well-aligned with scans of the other anatomies. However, in the anatomy of the liver the portal vein and the bile ducts are parallel but not overlapped. Thus, use of conventional registration algorithms that maximize the overlap of two objects by minimizing the spatial difference between the objects may not result in well-aligned scans.

Furthermore, changes in a patient's body posture can cause noticeable distortion of the liver, which is a soft tissue organ. For example, during scans of a patient's biliary system, the shape of a patient's liver may be distorted as compared to its shape during a previous scans of the patient's hepatic vascular system. In this example, alignment of the biliary scans with the vascular scans, while complicated by the spatial offset described above, may be further complicated by the effects of the distortion.

As evident from the discussion above, known methods and systems do not adequately provide an interactive vessel segmentation procedure that efficiently generates 3D vessel segmentation. Known methods and systems also do not adequately allow for pre-operative assessment of the vascular and biliary systems. And known systems do not offer a combination of quantification, flexibility, and ease-of-use desired by physicians.

SUMMARY

Existing limitations associated with the foregoing and other limitations can be overcome by a procedure for image segmentation on three-dimensional (3D) medical images and a procedure for aligning anatomic structures in images, and systems, apparatuses, and computer programs that operate in accordance with the procedures.

In accordance with one exemplary embodiment, the procedure for image segmentation on three-dimensional (3D) medical images, comprises generating a projection of a 3D image that includes an anatomic structure, tracing on the projection at least one curve corresponding to the anatomic structure, extracting a curved volume of interest based on the at least one curve and the projection, and extracting a segmentation of the anatomic structure in the curved volume of interest.

In accordance with another exemplary embodiment, the procedure for aligning anatomic structures in images comprises determining a part of a biliary system in a first image, determining a part of one of a hepatic portal vein and a hepatic artery in a second image, determining a gallbladder in the first and second images, determining a cost function based on at least one predetermined spatial relationship that relates to the biliary system and the one of a hepatic portal vein and a hepatic artery, and aligning the biliary system and the one of a hepatic portal vein and a hepatic artery by maximizing the cost function. The at least one predetermined spatial relationship includes an orientation of the part of a biliary system with respect to the part of the one of a hepatic portal vein and a hepatic artery.

BRIEF DESCRIPTION OF THE DRAWINGS

The teachings claimed and/or described herein are further described in terms of exemplary embodiments. These exemplary embodiments are described in detail with reference to the accompanying drawings. These embodiments are non-limiting exemplary embodiments, in which like reference numerals represent similar structures throughout the several views of the drawings.

DETAILED DESCRIPTION

Exemplary aspects described herein relate to methods, systems, apparatuses, and computer program products that assess hepatic vascular and biliary structures interactively and in real time. These exemplary embodiments can be used to facilitate quantitative assessment and evaluation of anatomic structures such as, for example, the liver, liver segments, vascular structures, vascular territory, biliary structures, and hepatic lesions. Such assessment and evaluation can include establishing spatial relationships among the anatomic structures, and may be used, for example, for pre-surgical planning of an operation to be performed to the liver and for evaluation of the liver after the operation.

System for Vessel, Biliary System, and Territory Analyses

Figure 1:
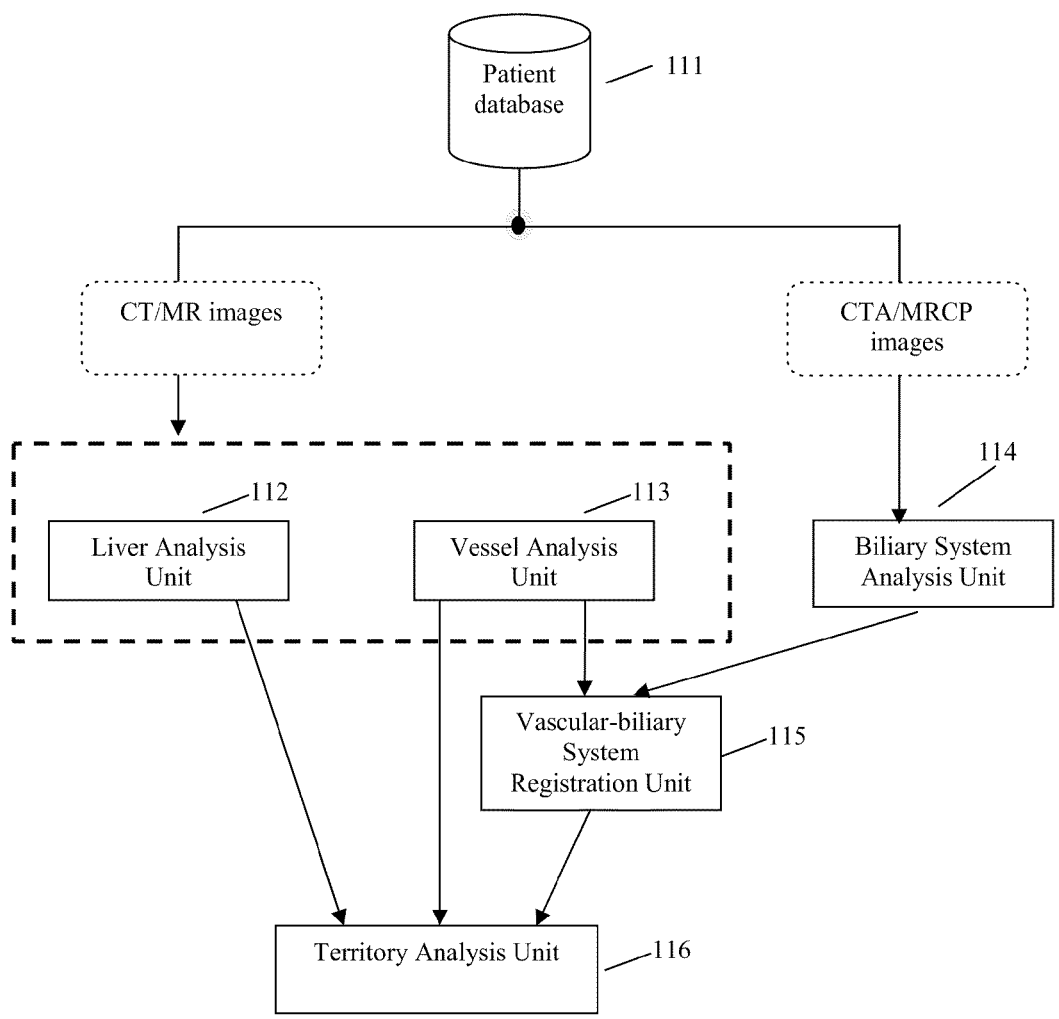
FIG. 1 illustrates an example construct of a system for pre- and post-operative assessment, according to an example embodiment herein.

FIG. 1 illustrates an exemplary construct of a system that may be used for pre- and/or post-operative surgical assessment, according to an example embodiment. The system includes patient database 111, liver analysis unit 112, vessel analysis unit 113, biliary system analysis unit 114, vascular-biliary system alignment unit 115, and territory analysis unit 116. Each of the components may be implemented via software, hardware, or firmware, and each may be configurable to be operated by a user.

The patient database 111 may be used to load images for assessment. For example, the images may be particular to a selected patient and related to vascular and/or biliary assessment of the patient's liver. Examples of such images include, without limitation, a CT scan, a MR scan, a magnetic resonance cholangiopancreatography (MRCP) scan, a CT cholangiograms (CTC) scan, and ultrasound scan. Scans loaded from patient database 111 may include multiple phases, e.g., multiple phases of CT or MR images may be scanned for comprehensive evaluation of anatomic structures such as, for example, the liver, lesions, and vessels.

Generally speaking, liver analysis unit 112, vessel analysis unit, 113, and biliary systems analysis unit 114 may be used to assist a user in quantitatively analyzing anatomies of the liver, e.g., the liver itself, hepatic lesions, and the vascular and biliary systems of the liver. In particular, liver analysis unit 112 may be used for liver segmentation and volumetry measurements, vessel analysis unit 113 may be used for vessel segmentation and analysis, and biliary systems analysis unit 114 may be used for biliary structure analysis.

In FIG. 1, CT and MR images loaded from patient database 111 are passed to liver analysis unit 112 and vessel analysis unit 113, while CTC and MRCP images are passed to biliary systems analysis unit 114. This configuration may be used because in some instances CT or MR images, though suitable for liver, lesion, and vessel analysis, for example, may not be suitable for analysis of biliary systems. Accordingly, other images, e.g., MRCP or CTC images, are used for biliary systems evaluation. However, it should be understood any specific modalities and purposes shown in FIG. 1 are merely for illustration rather than limitation. For example, although the figure illustrates MRCP or CTC images for biliary systems analysis, images from other modalities, including the same image scans used for liver and vessel analysis, may also be used for the biliary systems analysis.

The liver analysis unit 112, vessel analysis unit 113, and biliary system analysis unit 114 evaluate separately the liver structures, vessel systems, and biliary system, respectively. However, evaluating these anatomies separately may provide only limited assistance to pre-surgery planning. For example, a physician may wish to have a complete 3D anatomy of patient's liver in order to precisely plan a surgery based on a comprehensive consideration of the various vital anatomies, as well as their spatial relationships. In this instance, the physician may wish to have the patient's bile duct and gallbladder displayed in a 3D space on a computer screen together with the liver, lesions, and vessel trees, even though each of these anatomies are acquired and enhanced in a different modality, e.g., an MR scan and an MRCP scan. Accordingly, the system of FIG. 1 is further configured to align various anatomic structures.

Vascular-biliary systems alignment unit 115 may be configured to align biliary structures enhanced and/or segmented in scans of one modality or phase with the liver, lesions, and vessels enhanced and/or segmented in scans of another modality or phase. The vascular-biliary systems alignment unit 115 further may be configured to align arteries enhanced and/or segmented in an arterial phase scan with portal veins enhanced and/or segmented in a venous phase scan.

Territory analysis unit 116 may be configured to calculate, e.g., the supply/drainage territory and volumetry of each territory corresponding to a portal vein system, a hepatic vein system, an artery system, and a bile duct system. Territory analysis unit 116 may accept as input vessels and biliary structures aligned by other units of the system illustrated in FIG. 1. Territory analysis unit 116 further may be configured to calculate the supply/drainage territory of a specific vascular or bile duct branch. With such territory analysis, a physician may be able to quantitatively measure, for example, the volume of the affected liver when a vascular branch is removed during resection.

Vessel Analysis and Segmentation

As discussed above, vessel or bile duct segmentation can be difficult to perform. A vessel branch may be very thin, e.g., one pixel in width, and/or a vessel branch may be difficult to visualize on an image due to low contrast between the branch and nearby anatomic structures. These problems may be compounded for a diseased liver in which large intensity variation exists within parenchyma, e.g., hepatocytes of the liver, causing segmentation of thin vessel branches to be even more difficult. Techniques based on region growing may not generate sufficiently reliable or accurate output, and techniques based on atlas or model approaches are imprecise to patient-to-patient variation in liver vascular anatomies.

FIG. 2(*a*) illustrates an exemplary flow diagram for vessel analysis and segmentation. According to an example embodiment, the procedure illustrated by the flow diagram may be used to analyze one or more vascular structures using image data and segment those analyzed structures. Part or all of the procedure illustrated in this figure may be performed, for example, by vessel analysis unit 113 of FIG. 1.

At step 2-101, one or more maximum intensity projection (MIP) images of a 3D object are displayed. MIP is visualization method whereby 2D images from different depths, e.g., multiple CT slice or MR slices, are combined into a slab, i.e., a stack of slices, and voxels with the highest intensity in the slab are projected onto a 2D plane. However, in another example embodiment, minimum intensity projection (minIP) images may be used. MinIP images may be used, for example, where a biliary duct to be segmented has lower image intensity than other nearby anatomic structures. Moreover, still other example embodiments may use any other type of volume projection or image display suitable for revealing anatomic structures, e.g., bile ducts and portal veins.

FIGS. 2(*c*) to 2(*e*) show how the display of MIP images may assist in the imaging and segmentation of anatomic structures, e.g., the vascular systems of the liver. FIG. 2(*c*) is an image of a 2D slice obtained during CT scan of a patient's abdomen. Vessels typically have higher intensity than liver parenchyma. However, in this image, only small portions of the thin vessel branches are shown because due to the liver anatomy the branch follows a path that moves in and out of the plane of the CT scan slice. Therefore, it is neither practical nor efficient to use this image to manually trace a vessel branch.

FIGS. 2(*d*) and 2(*e*) are MIP images having slab thicknesses that include the slice of FIG. 2(*c*). Using the maximum intensity projection (MIP) technique, thin vessel branches become more visible, as these figures show. Adjusting the thickness of the MIP slab may render a different view of vessel branches. The MIP image in FIG. 2(*d*) has a larger slab thickness than the MIP image in FIG. 2(*e*). Accordingly, a complete vessel branch may be imaged in FIG. 2(*d*) but exhibit a break in FIG. 2(*e*). These MIP images show how a user may discern the vessel branch on 2D MIP image, and thus use such an image to trace the vessel branch using a 3D interactive vessel segmentation, as discussed below.

Where multiple MIP images are displayed at step 2-101, the images may include, for example, three orthogonal MIP images (e.g., axial, coronal and sagittal) or arbitrary angle multi-planar reformatting (MPR) MIP images of a 3D object, e.g., a medical study of a liver. Furthermore, the MIP images may be displayed in both 2D and 3D. In a 2D MIP display, an MIP slab of a predefined MIP depth is displayed. A user is able to navigate each MIP image across the medical image space, e.g., 3 orthogonal directions or along an arbitrary angle MPR direction. In a 3D display, multiple MIP images may be displayed at the same time, with the center at a current cross section point.

A decision block 2-102 following step 2-101 determines whether there are vascular structures that have not been segmented. The determination of the decision block may be made manually, e.g., by user input at a user interface, or automatically. The determination may be based on the images displayed at step 2-101.

At step 2-103, the depth or thickness of the MIP slabs may be adjusted. Different MIP slabs may be adjusted separately or together in order to best display a vascular branch that is to be segmented in an MIP image. In some example embodiments, the minimum of the MIP slab depth can be 1, i.e., non-MIP images can be viewed and adjusted. The window level of the MIP slabs also may be adjusted separately or together in order to best display the vascular branch. Step 2-103 may be bypassed, for example, if no adjustment of the MIP slabs is necessary or desired.

At step 2-105, one or more curves are drawn along an imaged vascular structure in order to sketch one or more vessels. The curves may be drawn manually, e.g., by user input at a user interface, or automatically. The image may be MIP images, minIP images, or original images, e.g., an image where the slab depth is 1. Sketching of the vessels may include another sketch on another MIP view, including any other orthogonal MIP images or an MIP MPR image of different angles. Such sketching may be used, for example, to further define the region of interest (ROI) of the vascular structure. An example of the completion of step 2-105 is shown in FIG. 2(*f*), which illustrates a sketch 2-401 drawn along a vessel on an MIP view. The MIP view in this figure is the same MIP view shown in FIG. 2(*d*).

At step 2-107, sketching points are used to perform vessel segmentation. This step may deploy a segmentation algorithm that uses inputs (e.g., the sketch 2-401 or another output from the sketch drawing step 2-105) to segment the vascular branch corresponding to the sketch. An example of such a segmentation algorithm is discussed below in connection with FIG. 2(*b*).

At step 2-109, the results of the segmentation are rendered. Rendering may include display of the segmentation results in both 2D and 3D. In a 3D display, a 3D segmented vascular object can be displayed. In the 2D display, a segmented vascular object may be overlaid on 2D images. Rendering may involve updating prior segmentation results where, for example, vascular structures were previously segmented or segmentation results are adjusted.

At step 2-111, a user may also further adjust the segmentation results interactively. Following such adjustment, the decision block 2-102 discussed above is entered again. If it is determined that there are vascular structures that have not been segmented, the analysis and segmentation portion of the procedure repeats. If it is determined that all desired vascular structures have been segmented, the procedure terminates.

Figure 2A:
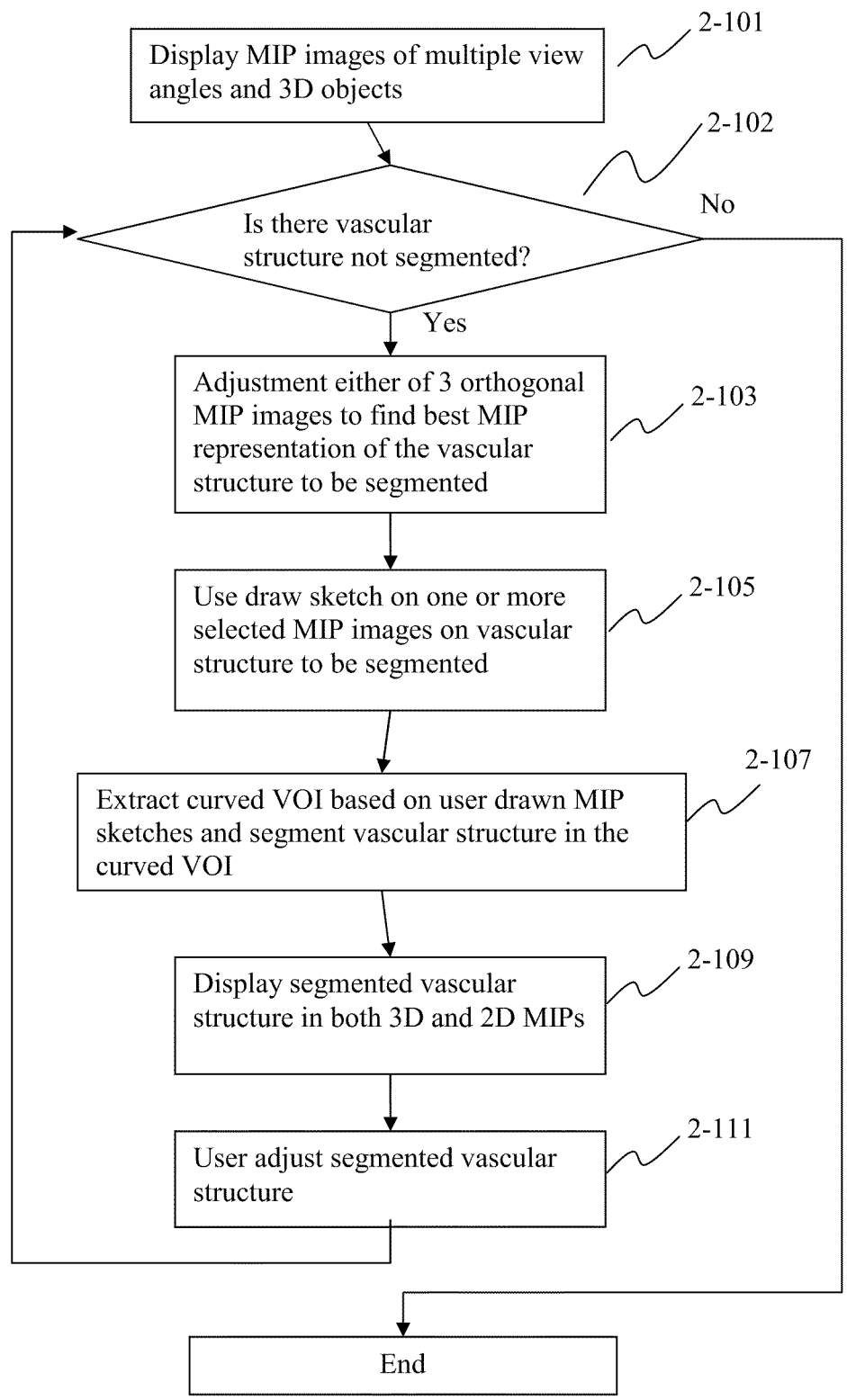
FIG. 2(a) illustrates a flow diagram for vessel analysis by a vessel analysis unit, according to an example embodiment herein.
Figure 2B:
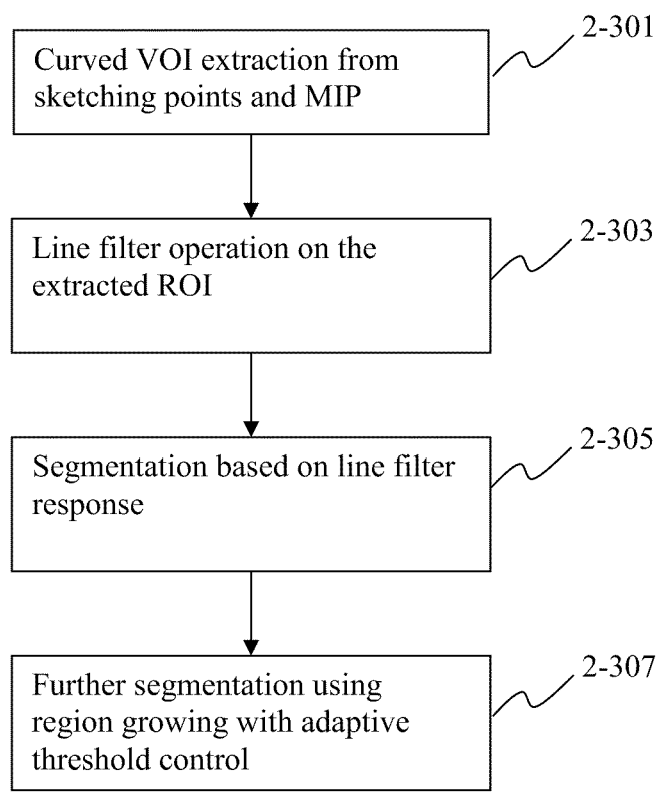
FIG. 2(b) illustrates a flow diagram for vessel segmentation, according to an example embodiment herein.
Figure 2C:
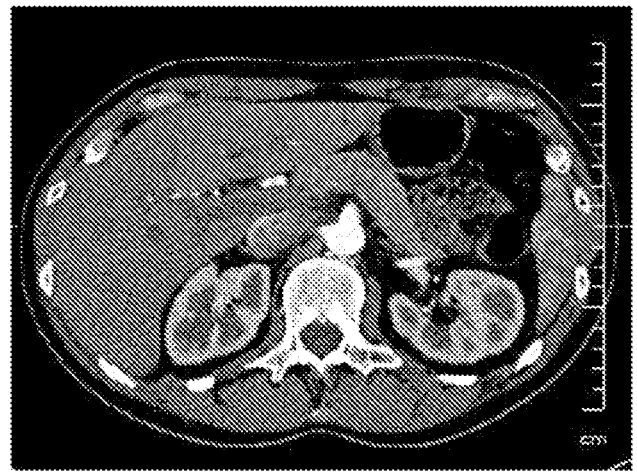
FIG. 2(c) is an image of a 2D slice of a CT scan.
Figure 2D:
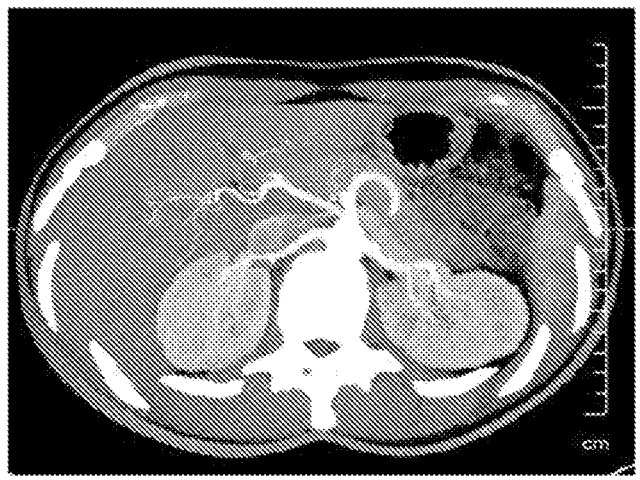
FIG. 2(d) is an image of an MIP view having a slab thickness that includes the slice of FIG. 2(c).
Figure 2E:
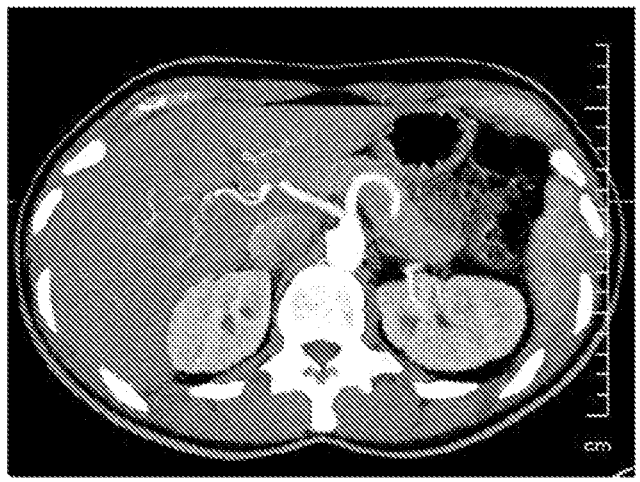
FIG. 2(e) is another image of an MIP view that includes the slice of FIG. 2(c) and a slab thickness different from the MIP view of FIG. 2(d).
Figure 2F:
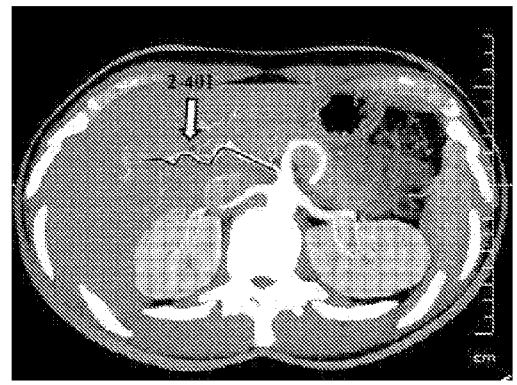
FIG. 2(f) illustrates a sketch drawn along a vessel on an MIP view.

FIG. 2(b) illustrates an exemplary flow diagram for vessel segmentation. This flow diagram is an example of a segmentation algorithm that may be used at step 2-107 of FIG. 2(a), as discussed above.

Figure 2G:
FIG. 2(g) illustrates a curved VOI extracted from the sketch illustrated in FIG. 2(f).

At step 2-301, a volume of interest (VOI) is extracted. The VOI may be used as a reference region from which a vascular structure can be segmented in other steps. Extraction of the VOI may be achieved by establishing a ROI based on a sketch of a vascular structure and expanding the ROI, as will now be described. First, a line along a particular direction, e.g., the direction of MIP at each sketching point, is projected. Voxels along this line that are inside the current MIP slab may be counted as within a ROI. Next, the ROI may be expanded in a plurality, e.g., all, 2D directions perpendicular to the axis along which the MIP image is projected. A curved volume of interest (VOI) is therefore extracted for analysis, as illustrated in FIG. 2(g). The curved VOI constrains the forward automated vessel segmentation based on user input incorporating expert knowledge. For example, a physician may be able to differentiate a targeted artery from surrounding veins on a displayed MIP image. Thus, the physician can draw a curve only on the artery and avoid the veins.

Extraction of a VOI at step 2-301 can include a combination of multiple VOIs. For example, a sketch drawn by a user may not be precise, and a segmentation system may not be sufficiently robust to tolerate such imprecision. Thus, a user may draw more than one sketch on different MIP views at the sketch drawing step 2-105. In this case, a separate VOI may be extracted corresponding to each sketch drawn. Based on the union of multiple VOIs, a further restrained VOI may be formed.

At step 2-303, a line filter algorithm is used to filter voxels within the VOI. Each voxel within the VOI may be applied with the line filter. One example of a suitable line filter is discussed in Yoshinobu Sato et al., *Three-dimensional multi-scale line filter for segmentation and visualization of curvilinear structure in medical images*, 2 Med. Image Analysis 101, 143 (1998), which is hereby incorporated by reference as if set forth fully herein. In an example embodiment, the line filter algorithm is implemented based on a 3D multi-scale line filter.

At step 2-305, output from the line filter response is selected as an initial segmentation inside the VOI. The selection may be based on a threshold, which is then applied by the line filter algorithm in order to threshold a line filter response. For example, the filtered result from step 2-303 may be connected regions having voxels with line filter responses. This filtered result can be applied to the threshold to yield voxels having line filter responses higher than the threshold. These voxels may be selected as the initial segmentation of a vascular structure inside the VOI. The threshold may be adjustable and selectable at step 2-305 or at other steps. For example, a user may adjust the line filter response threshold at step 2-111 of the flow diagram of FIG. 2(a).

At step 2-307, output from line filter segmentation is used for adaptive segmentation. Adaptive segmentation can include a step of adaptive region growing based on voxel intensity level. Region growing may be based on a threshold, e.g., a threshold lower than the filter response threshold, and the threshold may be adjusted during adaptive segmentation. For example, the region growing threshold may be adaptively adjusted while the system automatically checks the shape of the segmented object to assure that it maintains tube-like structures. Due to the low contrast of thin vascular structures, results obtained by line filter segmentation may yield multiple broken pieces. However, during region growing a user or a system may connect the broken vascular branches by analyzing their shapes and spatial relationship. The region growing threshold may be adjustable and selectable at other steps including, for example, step 2-111 of the flow diagram of FIG. 2(a).

Figure 2H:
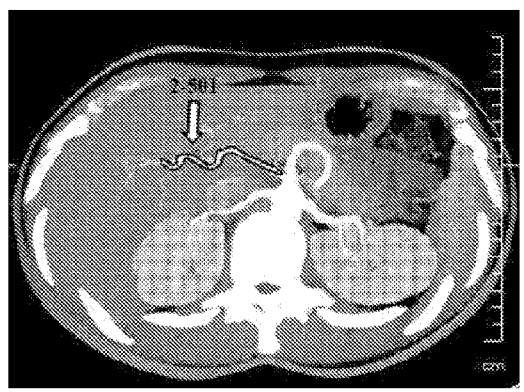
FIG. 2(h) illustrates a thin vessel segmentation result displayed in an MIP view.
Figure 2I:
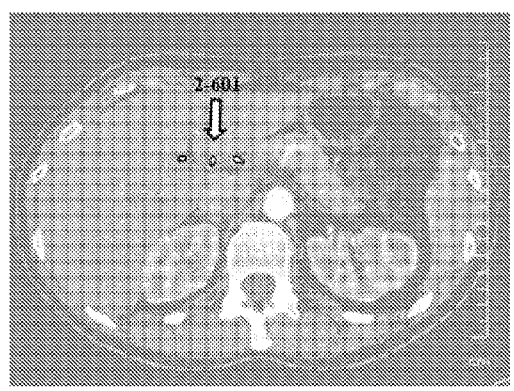
FIG. 2(i) illustrates a thin vessel segmentation result displayed in an original 2D slice.

An example result of vessel segmentation is shown in FIGS. 2(h) and 2(i). In particular, FIG. 2(h) illustrates a vessel segmentation result 2-501 overlaid on an MIP image, and FIG. 2(i) illustrates a vessel segmentation result 2-601 in a 2D image slice.

Vessel segmentation is not limited to segmentation performed by a line filter response algorithm. Rather, vessel segmentation may be performed by procedures other than the example procedures described in connection with FIG. 2(b). For example, other optimization procedures may be performed to extract vascular structures based on user-drawn sketches on MIP images. In another example embodiment, a dynamic programming procedure may be used to find a 3D path inside a VOI. As is known by those having skill in the relevant art, dynamic programming is an algorithm for breaking down a complicated problem into a simple recursive search. Examples of dynamic programming are presented in S. Dasgupta et al., Algorithms (2006). The optimal path found by the dynamic programming method may represent the path inside the curved VOI with maximal sum of linear filter response and/or grayscale values. The derived 3D path may be fitted with respect to a tubular model to approximate the vascular structure that has been segmented.

The vessel analysis and segmentation procedures described above in connection with FIGS. 2(a) to 2(i) may also be used for biliary system analysis and segmentation. In this regard, biliary structure analysis unit 114 may perform procedures similar to those performed by vessel analysis unit 113. However, the biliary structure analysis unit 114 may perform different segmentation procedures. For example, the gallbladder, which is a component of the biliary system, may be segmented using a different procedure. An example of such a procedure includes seeding (automatic or manual) with region growing, adaptive thresholding, and shape perseveration. In this example, the values and ranges of the threshold are different from those in vessel segmentation. The shape of the region (e.g., a circularity on each slice) to be segmented is calculated and the shape serves as a condition in threshold value selection.

Vascular-Biliary System Alignment

Displaying different anatomic parts, e.g., liver, lesions, portal veins, hepatic veins, hepatic arteries, bile ducts, and the gallbladder, in the same 3D space can greatly enhance a physician's ability to recognize and distinguish spatial relationship among those anatomic parts. As discussed above, vessel and biliary system segmentation procedures, as performed on, for example, vessel analysis unit 113 and/or biliary structure analysis unit 114, may be used to segment and quantify individual vessels and bile systems. However, these segmented systems may not be easily combinable into a single 3D space because segmentation of such anatomies often is performed on different phase scans of the same modality or on scans from multiple modalities. For example, an artery may often be enhanced and visualized in an arterial phase of a CT or an MR scan, while veins may often be enhanced and visualized in a venous phase. Furthermore, a biliary system may often be imaged using MRCP or CTC scans. Due to the use of different phases and/or modalities, the patient posture across these different scans may vary. If the biliary system is simply rendered in the liver 3D space, a large spatial variation is likely to result. Instead, the scan and/or segmentation of the biliary system must be aligned with the scan and/or segmentation of another anatomic structure, e.g., the vascular system.

Figure 4A:
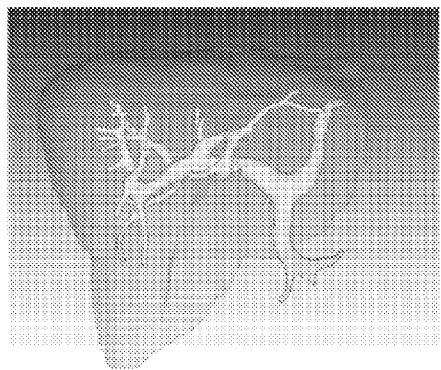
FIG. 4(a) shows a 3D rendering of a liver space including a segmented portal vein.
Figure 4B:
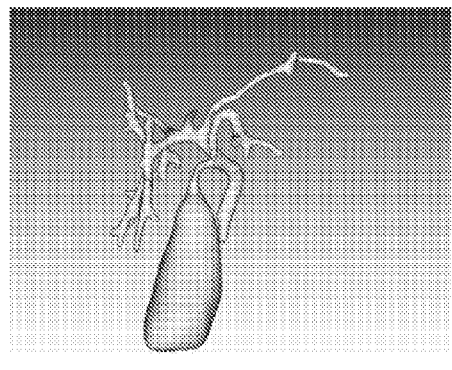
FIG. 4(b) shows a 3D rendering of a segmented biliary system including a gallbladder.
Figure 4C:
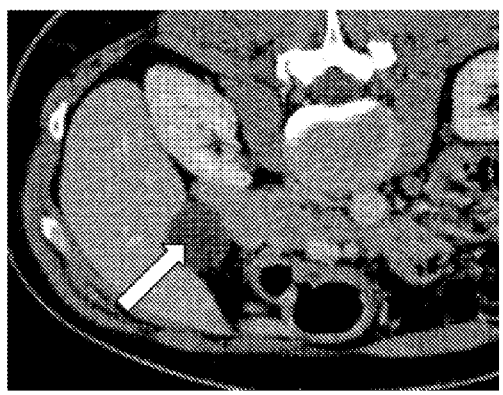
FIG. 4(c) shows a CT scan of a patient's abdomen with an arrow indicating the gallbladder.
Figure 4D:
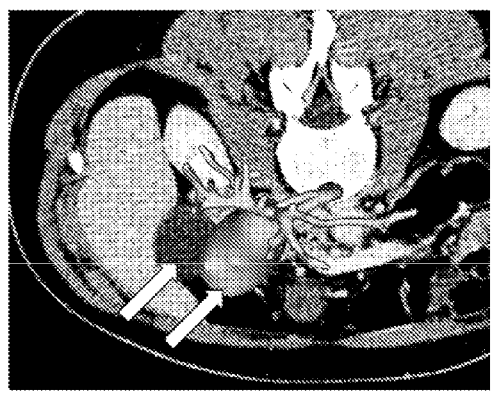
FIG. 4(d) shows a spatial variation between segmented biliary system and the CT scan shown in FIG. 4(c).
Figure 4E:
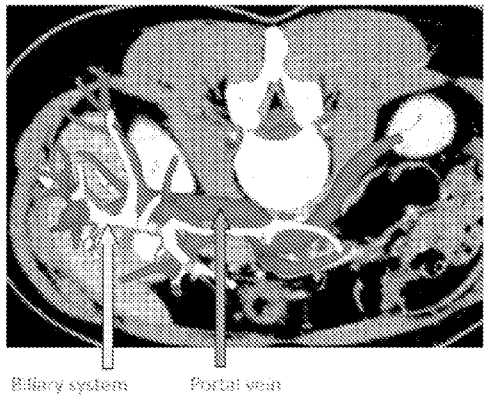
FIG. 4(e) shows a segmented biliary system aligned to a liver space on the CT scan shown in FIG. 4(c).

FIG. 4(d) illustrates a spatial variation resulting from the combination of a biliary system segmented from one scan with another scan of other intrahepatic structures. In the figure, the gallbladder and the rest of the biliary system, which have been segmented from a CTC scan, are rendered in a 2D CT image. However, due to differences such as patient posture, the biliary system is significantly offset from the other liver anatomies. As this figure demonstrates, the alignment of anatomies segmented from multiple scans is important for pre- and post-operative assessment.

However, alignment of anatomic structures in one scan to anatomic structures in another scan may be complicated by imaging characteristics of those structures. For example, bile ducts segmented from MRCP or CTC data may not be easily aligned to CT or MR data because bile ducts typically are not imaged by CT or MR techniques, whereas many of the other intra-hepatic anatomies, including hepatic artery, portal vein, and hepatic vein, are imaged by those techniques. Thus, there may not be anatomical structures present in the CT or MR scan to which segmented bile ducts may be aligned. An example of this problem is illustrated in FIG. 4(c), which shows a CT scan of a patient's abdomen in which the bile ducts are not imaged. Furthermore, an MRCP scan may substantially reveal only biliary structures; the scan may reveal minimal information of the anatomy of the liver. As a result, there may be few anatomical landmarks, if any, that can be used for cross-volume or cross-modality registration. Accordingly, conventional registration approaches that use detected landmarks for registration may not be suitable in this instance.

In some example embodiments, alignment of the biliary system to other anatomic structures can proceed in part based on registration of the gallbladder. The gallbladder, to which the bile ducts are connected, may be imaged by MRCP or CTC techniques, as well as CT or MR techniques. However, although gallbladder is visible on both MRCP/CTC scans and CT/MR scans, its size may vary significantly, e.g., due to the effect of an injected contrast agent. For example, a gallbladder, as imaged on MRCP/CTC scans, can be much larger in size than a gallbladder images on CT/MR scans. This is illustrated by FIGS. 4(b) to 4(d). FIG. 4(b) shows a 3D rendering of a segmented biliary system, including the gallbladder, as obtained from a CTC scan, while the arrow in FIG. 4(c) points to the imaging of the gallbladder in a CT scan. FIG. 4(d), which as discussed above shows the mismatch in spatial alignment between the two scans, also shows the difference in size of the gallbladder between a CTC scan and a CT scan. Therefore, there may be little "ground truth" information, e.g., information consistent between scans from different phases or modalities, that may be relied upon during registration of the gallbladder.

Figure 5A:
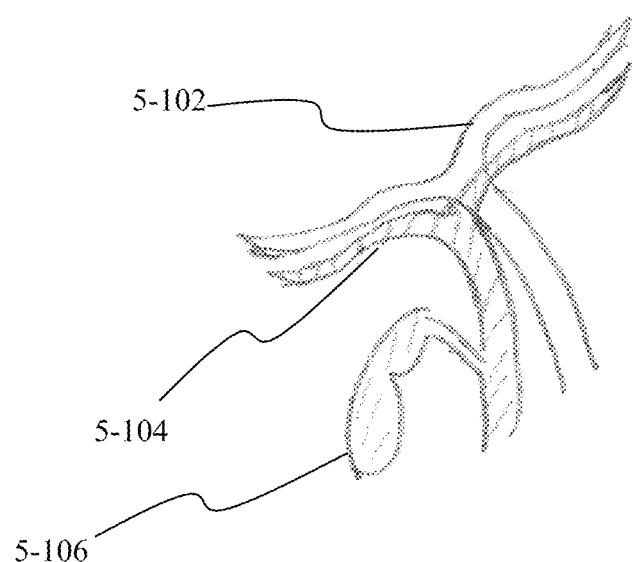
FIG. 5(a) illustrates a portal vein system and a biliary system.

Accordingly, in example embodiments where alignment is based in part on registration of the gallbladder, alignment may proceed based also on features of the liver anatomy, specifically, the bile ducts. The bile ducts go along with portal vein and artery, but these structures are not overlapped. FIG. 5(a) illustrates a portal vein system and a biliary system. As shown in this figure, the portal vein 5-102 and the bile duct 5-104 run parallel to each other, but they do not overlap. Therefore, conventional registration algorithms that maximize the overlap of two objects are not suitable for alignment.

In accordance with these example embodiments, a procedure for aligning biliary or vascular structures that are enhanced and segmented in scans of multiple phases or scans of multiple modalities combines the registration of the same anatomical structure with the alignment of different anatomical structures into a single procedure. In particular, the alignment procedure finds an alignment that maximizes the overlap between gallbladders in two scans and/or the consistency of characteristics (e.g., orientation, center of mass, etc.) between gallbladders from two scans, and minimizes the overlaps between portal vein and bile duct, while concurrently minimizing the distances between surface points of portal vein and bile duct.

Figure 5B:
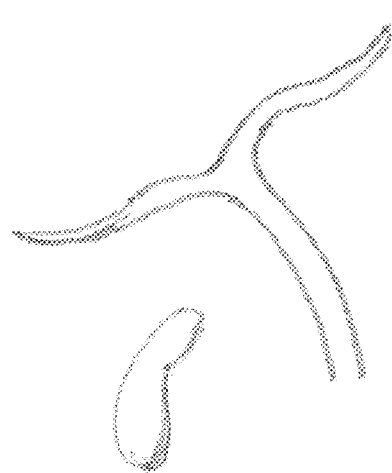
FIG. 5(b) illustrates a portal vein and a gallbladder that are visible in a CT or MR scan.
Figure 5C:
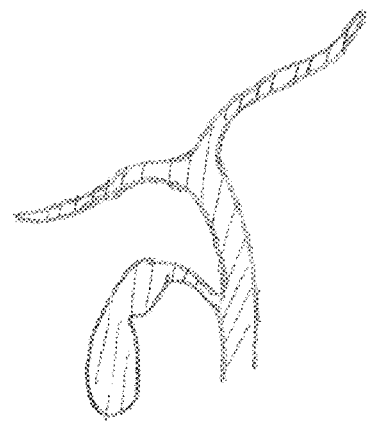
FIG. 5(c) illustrates a bile duct and a gallbladder that are visible in an MRCP or CTC scan.

Examples of scans suitable for the alignment procedure are illustrated in FIGS. 5(b) and 5(c). FIG. 5(b) illustrates the portal vein and the gallbladder segmented in one scan, e.g., a CT scan, while FIG. 5(c) illustrates the bile duct and gallbladder segmented from another scan, e.g., a CTC scan.

Figure 5D:
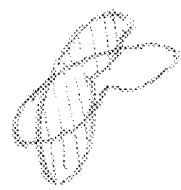
FIG. 5(d) illustrates an overlap between gallbladders from different scans.
Figure 5E:
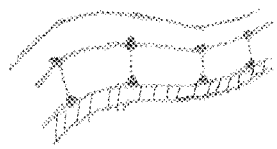
FIG. 5(e) illustrates surface distance between a portal vein and a bile duct.

In an example embodiment, the alignment procedure includes determining a cost function. An example cost function is as follows:

$$\text{Cost} = w_1 \cdot \text{overlap}(\text{gallbladder\_1}, \text{gallbladder\_2}) - $$
$$w_2 \cdot \text{overlap}(\text{portal\_vein}, \text{bile\_duct}) - $$
$$w_3 \cdot \text{surface\_distance}(\text{portal\_vein}, \text{bile\_duct}),$$

where overlap(object1, object2) is a function that measures overlap between object1 and object2 and/or the consistency of characteristics (e.g., orientation, center of mass) between object1 and object2, surface_distance(object1, object2) is a function that measures the distance between two surfaces, and $w_1$, $w_2$, and $w_3$ are weighting factors that balance the importance among the three components above. The alignment procedure finds a set of alignment parameters that can maximize the cost function. FIG. 5(d) illustrates an overlap between the gallbladder segmented from one scan and the gallbladder segmented from another scan, while FIG. 5(e) illustrates a surface distance between a portal vein and a bile duct.

Figure 3:
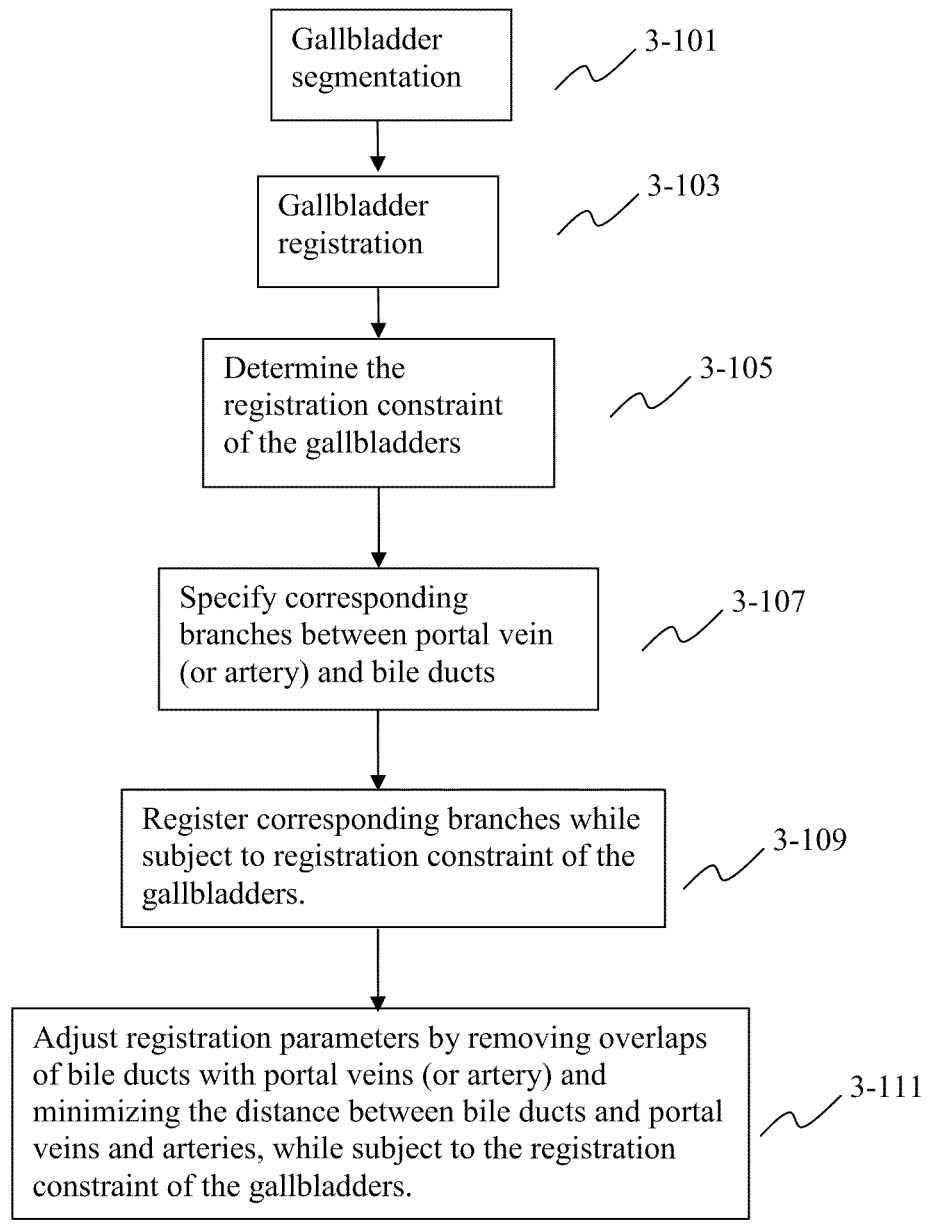
FIG. 3 illustrates a flow diagram for registration of vascular and biliary structures, according to an example embodiment herein.

An alignment procedure will now be described in further detail. FIG. 3 illustrates an exemplary flow diagram such a procedure. The procedure illustrated by this figure may be one performed by, for example, the vascular-biliary structure alignment unit 115. For example, the procedure may be used to align biliary structures segmented based on an MRCP or CTC scan with vascular structures segmented based on a CT or MR scan. While the procedure is described with respect to CT and MRCP scans, these are non-limiting examples merely done for ease of understanding. Other modalities, including modalities other than CT, MR, MRCP, and CTC, may be used for any of the scans referred to in the description of the procedure.

At step 3-101, both the portal veins and the hepatic arteries in CT modalities and the bile ducts in an MRCP modality are segmented. Gallbladders in both CT and MRCP modalities may also be segmented. The segmentation of portal veins, arteries, and gallbladders in CT and the bile ducts and gallbladder in MR may be performed individually in an interactive or automatic manner. For example, a user may click on an object of interest, e.g., the gallbladder, to initiate an interactive segmentation process. Then, from the segmented objects, the gallbladder in both CT and MRCP may be identified, either automatically or interactively based on its geometric shape and location properties. For example, gallbladders may be identified, without segmentation, on 2D images with the positions, orientations, and sizes indicated, such as by 2D or 3D bounding boxes.

At step 3-103, segmented or identified gallbladders in CT and MRCP may be aligned in order to align the corresponding CT and MRCP coordinate systems. The initial alignment may be understood as preliminary registration because the shape of a gallbladder is elongated and sometimes may not provide adequate constraints on orientation alignment of the two coordinate systems.

At step 3-105, based on the registration at step 3-103, constraint(s) on the registration of the gallbladder are identified. One example of this is a constraint on permissible adjustments to the position and/or orientation of the gallbladder in subsequent alignment steps. For example, a center of registration may be identified as an average center of the gallbladders in CT and MRCP after registration. This center can be treated as a center of rotation which may be kept unchanged in subsequent alignment steps. As another example, a bounding box may be defined, with the bounding box representing limits to the range of adjustment of the position of a gallbladder in subsequent alignment steps.

At step 3-107, branches and/or fork points corresponding between the portal vein (or arteries) and the bile ducts are specified, i.e., identified. Specification may include identifying which branches and/or fork points of the portal vein and bile ducts should be parallel to each other. Underlying this specification is the fact that in the liver anatomy, portal veins, arteries, and bile ducts are bundled together and run parallel of each other. Corresponding branches or fork points may be identified automatically. For example, if the segmented portal veins (or arteries) and bile ducts are represented using a tree structure, a system may be able to automatically label the branches according to stored or predetermined anatomical knowledge.

In some example embodiments, not all branches in the entire vascular and biliay trees need to be paired, but only those large ones can be paired. For example, the first and/or second generations of portal veins (or hepatic artery) and bile ducts may be used for pairing, and the smaller branches at lower levels will be aligned with the large branches accordingly.

At step 3-109, the corresponding branches and/or forks of the portal vein (or arteries) and the bile ducts are aligned. The alignment of the branches is performed within the registration constraints of the gallbladder identified at step 3-105. Registration at step 3-109 may yield overlapping branches of bile duct and portal vein (or artery) that may not fully correspond to the actual anatomy of the liver due to differences in orientation between the CT and MRCP data. In other words, registration within the gallbladder constraints may cause, for example, a registration of the portal vein and bile duct where there is an overlap of these anatomic structures. However, in the liver anatomy, the bile ducts and the portal vein run in parallel but are not overlapped. Accordingly, other steps of the procedure, e.g., step 3-111, may account for this difference in orientation and may obtain an anatomically-optimized alignment result by, for example, reducing overlap.

At step 3-111, the alignment parameters obtained at step 3-109 are adjusted to minimize overlap of the bile ducts and portal veins and/or arteries while minimizing the overall distance between the bile ducts and/or the portal veins and arteries. The adjustment may include rotation of one or both coordinate systems, and it may be implemented based on a constrained optimization method. In view of the description of example embodiments herein, suitable constrained optimization methods will be apparent to those having skill in the art. One example is the method of Lagrange multipliers. Moreover, the alignment constraint(s) with respect to the gallbladder may continue to be applied at this step.

Although not shown in FIG. 3, after the alignment procedure above is performed, further manual adjustment may be made to fine-tune the alignment results. Specifically, shift and/or rotation of one coordinate system may be made to visually align objects of interest from the two coordinate systems. For example, a user may interactively adjust the location and orientation of a biliary system by shifting or rotating the 3D rendered biliary system. FIG. 4(*e*) illustrates an example of an aligned biliary system rendered in the liver 3D space and overlaid on an original CT 2D image slice.

The flow diagram illustrated in FIG. 3 may also be applied to align arteries segmented in an arterial phase and portal veins segmented in a venous phase. Furthermore, as arteries and portal veins may be visible in one phase, in an example embodiment, landmarks on 3D and 2D may be cross referenced interactively by a user or automatically by a alignment system.

Figure 6:
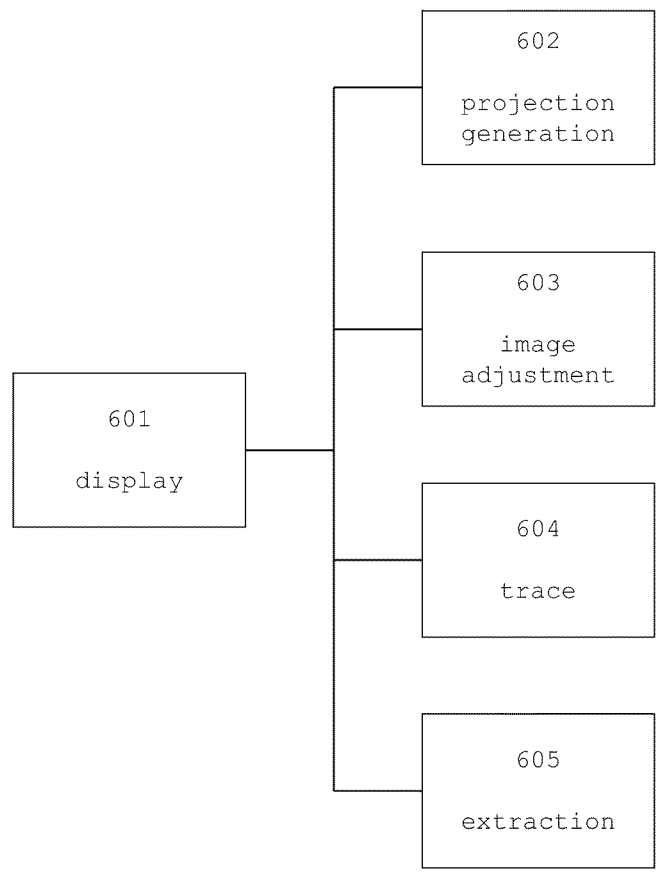
FIG. 6 is a diagram of functional modules configured in accordance with the flow diagram of FIG. 2(a).
Figure 7:
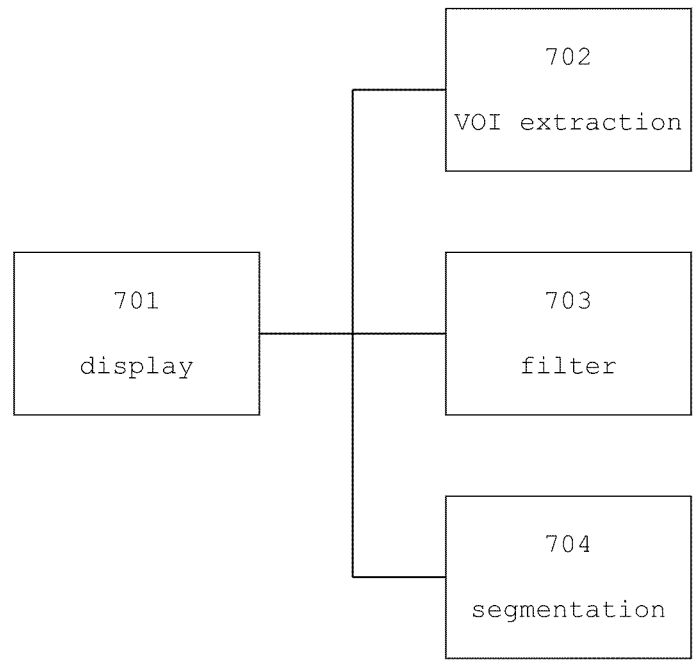
FIG. 7 is a diagram of functional modules configured in accordance with the flow diagram of FIG. 2(b).
Figure 8:
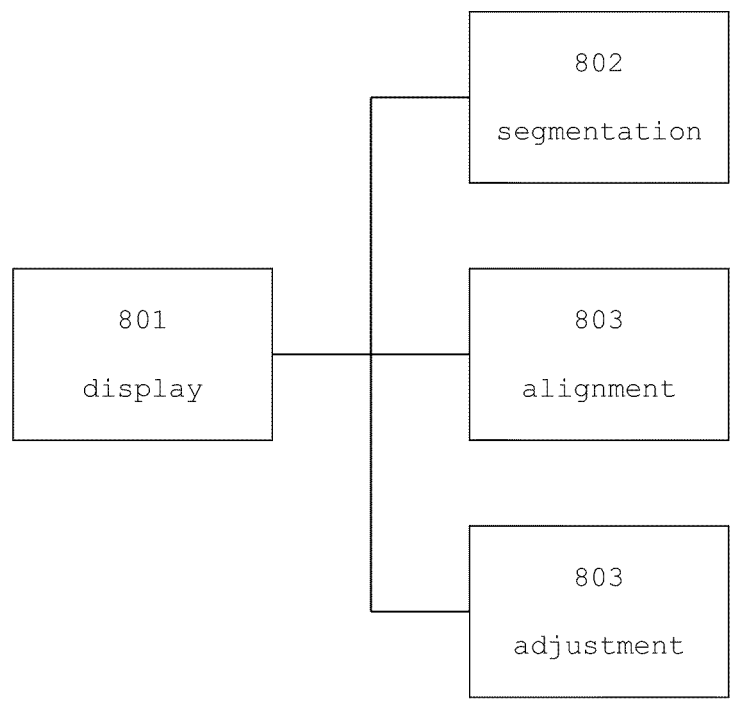
FIG. 8 is a diagram of functional configured in accordance with the flow diagram of FIG. 3.

FIGS. 6 to 8 shows diagrams of functional modules configured in accordance with various example embodiments. The modules (whether individually or configured together) shown in these figures may comprise any of the components of the system of FIG. 1.

The modules of FIG. 6 are configured in accordance with the flow diagram of FIG. 2(*a*). The modules include display module 601, projection generation module 602, image adjustment module 603, trace module 604, and extraction module 605. Each module is communicatively coupled to the other modules. The display module 601 may be configured to perform tasks associated with steps 2-101 and 2-109, as well as display output associated with tasks performed by the other modules. The projection generation module 602 may be configured to perform tasks associated with step 2-101. The image adjustment module 603 may be configured to perform tasks associated with steps 2-103 and 2-111. The trace module 604 may be configured to perform tasks associated with step 2-105. The extraction module 605 may be configured to perform tasks associated with step 2-107.

The modules of FIG. 7 are configured in accordance with the flow diagram of FIG. 2(*b*). The modules include display module 701, VOI extraction module 702, filter module 703, and segmentation module 704. Each module is communicatively coupled to the other modules. The display module 701 may be configured to display output associated with tasks performed by the other modules. The VOI extraction module 702 may be configured to perform tasks associated with step 2-301. The filter module 703 may be configured to perform tasks associated with step 3-303. The segmentation module 704 may be configured to perform tasks associated with steps 2-305 and 2-307.

The modules of FIG. 8 are configured in accordance with the flow diagram of FIG. 3. The modules include display module 801, segmentation module 802, alignment module 803, and adjustment module 804. Each module is communicatively coupled to the other modules. The display module 801 may be configured to display output associated with tasks performed by the other modules. The segmentation module 802 may be configured to perform tasks associated with step 3-101. The alignment module 803 may be configured to perform tasks associated with steps 3-103, 3-105, 3-107 and 3-109. The adjustment module 804 may be configured to perform tasks associated with step 3-111.

The modules of FIGS. 6 to 8 each may include software, hardware, or a combination thereof, and at least some of those modules may be incorporated within a data processing system, and example of which is discussed below in connection with FIG. 9. As one example, a module may be embodied, at least in part, in computer program instructions stored in a storage device, or may be made up of a hardware component(s) located in or in association with a processor.

Figure 9:
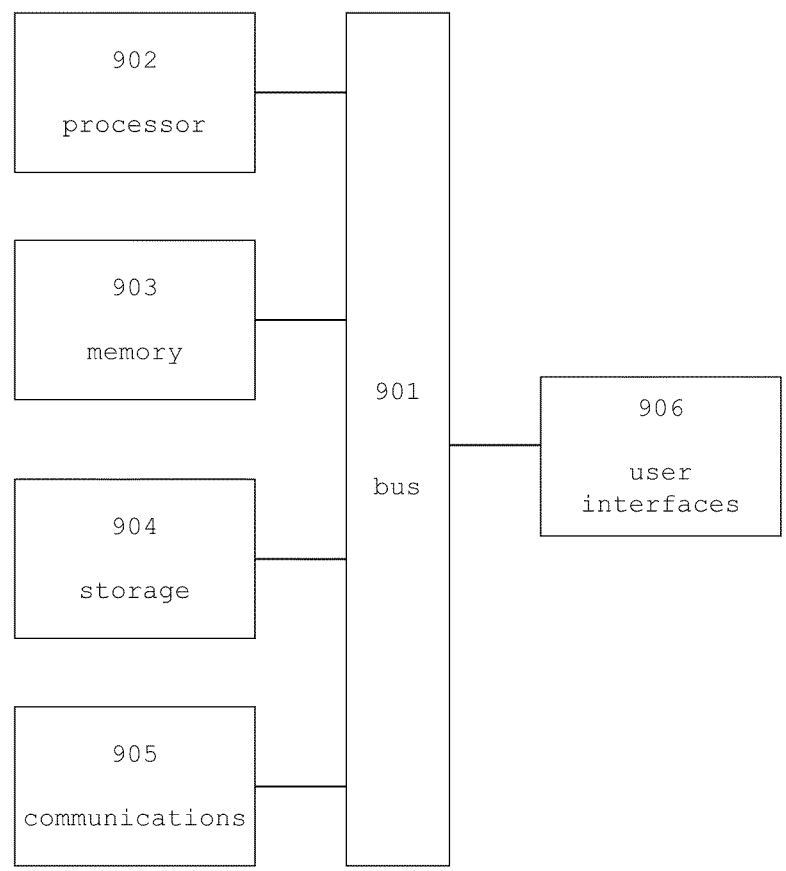
FIG. 9 is a diagram of an example computing architecture.

FIG. 9 is a diagram of an example data processing system. The system of FIG. 9 includes a processor 902, a memory 903, a storage device 904, a communications device 905, and user interfaces 906, all of which are coupled to a bus 901.

The processor 902 can communicate with the other components of the architecture through the bus 901. The storage device 904 includes one or more machine-readable media. The storage device 904 can be configured to read and write data including program instructions that may be executed by the processor 902 and operating systems (e.g., Microsoft Windows, UNIX) that allow the processor 902 to control the operation of the other components. The communications device 905 can be configured to allow the processor 902 to communicate with, e.g., a network and the internet. The user interfaces 906 can include input devices (e.g., keyboards, mice, joysticks, trackpads, stylus tablets, microphones, and cameras) and output devices (e.g., video displays, printers, speakers). The user interfaces 906 can comprise, at least in part, any of the interfaces or displays discussed herein.

The processor 902 may be configured to perform any of the procedures described herein. For example, the procedures may be stored on the storage device in the form of machine-readable program instructions. To execute a procedure, then, the processor loads the appropriate instructions, as stored on the storage device 904, into the memory 903, and then executes the loaded instructions.

Again, some example aspects described herein provide a vessel segmentation procedure that generates 3D vessel segmentation based on scans of anatomic structures. Other example aspects described herein provide an alignment procedure that allows for the assessment of a patient's vascular and biliary systems. By virtue of these procedures, an enhanced pre-operative assessment of the patient's anatomy may be made.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine readable medium," or "memory" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

In addition, it is not necessary that the procedures performed by the analysts be done with a computer, and instead they can be performed by a human operator.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed is:

1. A procedure for image segmentation on three-dimensional (3D) medical images, comprising:
   generating a two-dimensional (2D) projection image of a tubular anatomic structure from a 3D image with adaptive slab thickness;
   tracing on the display of a 2D projection image, via a user input at a user interface, at least one open curve corresponding to the tubular anatomic structure;
   extracting a curved volume of interest based on the at least one traced open curve, the slab thickness, and the 3D image by projecting pixels along the traced open curve within the 3D image along a specific direction and expanding the projected curve along a plurality of directions that are perpendicular to an axis of the projected curve;
   applying a filter algorithm, having a selectable threshold, to the curved volume of interest; and
   extracting a 3D segmentation of the tubular anatomic structure in the curved volume of interest by performing segmentation based on a result of the filter algorithm and connecting broken segments based on an orientation of the curve.

2. A procedure according to claim 1, further comprising adjusting the threshold, and wherein
   the connecting also includes interpolating the result of the filter algorithm to connect the broken segments based on the orientation of the curve.

3. A procedure according to claim 2, wherein the filter algorithm is a line filter algorithm, and wherein the performing of the segmentation includes adaptive region growing based on at least one voxel in the region of interest.

4. A procedure according to claim 1, wherein the anatomic structure includes at least part of one of a biliary system, a hepatic vascular system, and a hepatic arterial system.

5. A procedure according to claim 4, wherein the 2D projection image is one of a maximum intensity projection and a minimum intensity projection.

6. A procedure according to claim 5, further comprising adjusting the slab thickness of the 2D projection image prior to the tracing on the 2D projection image.

7. A system for image segmentation, comprising:
a processor; and
a memory device accessible by the processor and storing at least one of:
  computer code executable by the processor, and
  data used by the computer code,
wherein the computer code includes:
  a projection generation module configured to generate a two-dimensional (2D) projection image of a tubular anatomic structure from a three-dimensional (3D) image with adaptive slab thickness;
  a trace module configured to trace on the display of a 2D projection image, via a user input at a user interface, at least one open curve corresponding to the tubular anatomic structure; and
  an extraction module configured to:
    extract a curved volume of interest based on the at least one traced open curve, the slab thickness, and the 3D image by projecting pixels along the traced open curve on the 3D image along a specific direction and expanding the projected curve along a plurality of directions that are perpendicular to an axis of the projected curve,
    apply a filter algorithm to the curved volume of interest, and
    extract a 3D segmentation of the tubular anatomic structure in the curved volume of interest by performing segmentation based on the threshold segmentation and connecting broken segments based on an orientation of the curve.

8. A system according to claim 7, wherein the extraction module is further configured to adjust the selectable threshold and interpolate the result of the filter algorithm to connect the broken segments based on the orientation of the curve.

9. A system according to claim 8, wherein the filter algorithm is a line filter algorithm, and wherein the extraction module, when performing segmentation, applies adaptive region growing based on at least one voxel in the region of interest.

10. A system according to claim 7, wherein the anatomic structure includes at least part of one of a biliary system, a hepatic vascular system, and a hepatic arterial system.

11. A system according to claim 7, further comprising a database coupled to the analysis module,
  wherein the projection generation module receives the 3D image from the database, and wherein the 2D projection image is one of a maximum intensity projection and a minimum intensity projection.

12. A system according to claim 11, further comprising an adjustment module configured to adjust the slab thickness of the 2D projection image.

* * * * *

UNITED STATES PATENT AND TRADEMARK OFFICE
CERTIFICATE OF CORRECTION

Page 1 of 2

PATENT NO.       : 9,280,822 B2
APPLICATION NO.  : 12/776248
DATED            : March 8, 2016
INVENTOR(S)      : Fan et al.

It is certified that error appears in the above-identified patent and that said Letters Patent is hereby corrected as shown below:

In the Specification

COLUMN 1:

Line 9, "prior" should read --priority--; and
  Line 45, "model based" should read --model-based--.

COLUMN 2:

Line 11, "scans" should read --scan--.

COLUMN 3:

Line 50, "functional" should read --functional modules--.

COLUMN 4:

Line 23, "unit, 113," should read --unit 113,--;
  Line 39, "understood" should read --understood that--; and
  Line 58, "are" should read --is--.

COLUMN 5:

Line 36, "visualiza-" should read --a visualiza- --.

COLUMN 7:

Line 13, "a ROI." should read --an ROI.--; and
  Line 66, "growing" should read --growing,--.

Signed and Sealed this
Twenty-third Day of August, 2016

Michelle K. Lee
*Director of the United States Patent and Trademark Office*

COLUMN 9:

Line 38, "gallbladder" should read --the gallbladder--; and
    Line 42, "images" should read --imaged--.

COLUMN 10:

Line 41, "diagram" should read --diagram of--.

COLUMN 11:

Line 27, "of" should read --to--.